(12) United States Patent
Mori

(10) Patent No.: US 8,462,700 B2
(45) Date of Patent: Jun. 11, 2013

(54) TERMINAL DEVICE, COMMUNICATION SYSTEM, TERMINAL METHOD AND INFORMATION MEMORY MEDIUM

(75) Inventor: Shoji Mori, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 442 days.

(21) Appl. No.: 12/710,507

(22) Filed: Feb. 23, 2010

(65) Prior Publication Data

US 2010/0214987 A1 Aug. 26, 2010

(30) Foreign Application Priority Data

Feb. 23, 2009 (JP) ................................. 2009-038963

(51) Int. Cl.
*H04W 40/00* (2009.01)
(52) U.S. Cl.
USPC ......................................................... 370/328
(58) Field of Classification Search
USPC .................. 370/328; 455/554, 424, 560, 41.2
See application file for complete search history.

(56) References Cited

U.S. PATENT DOCUMENTS

| | | | |
|---|---|---|---|
| 2004/0054678 A1* | 3/2004 | Okamoto et al. .............. | 707/100 |
| 2004/0109023 A1* | 6/2004 | Tsuchiya ....................... | 345/758 |
| 2006/0252548 A1* | 11/2006 | Sasaki et al. ..................... | 463/42 |
| 2009/0088259 A1* | 4/2009 | Gosztyla et al. ................ | 463/43 |
| 2009/0227206 A1* | 9/2009 | Tada et al. ..................... | 455/41.2 |

FOREIGN PATENT DOCUMENTS

| | | |
|---|---|---|
| JP | 2004-154365 | 3/2004 |
| JP | 2006-148448 A | 6/2006 |
| JP | 2006-311139 A | 11/2006 |
| JP | 2006-334386 A | 12/2006 |
| JP | 2008-200137 A | 9/2008 |
| JP | 2008-211444 A | 9/2008 |

OTHER PUBLICATIONS

Japanese Office Action with English Translation (Issued Feb. 26, 2013).

* cited by examiner

*Primary Examiner* — Huy D. Vu
*Assistant Examiner* — Teisha D Hall
(74) *Attorney, Agent, or Firm* — Howard & Howard Attorneys PLLC

(57) ABSTRACT

There is provided a terminal device or the like which can prevent a user from fall in trouble with an unknown third person when the user executes a network game or the like over a computer communication network. As terminal devices establish a connection in an ad-hoc mode, individual unique identification information thereof are exchanged and a communication for a game is carried out, the terminal devices saves the unique identification information of the communication counterparty. When the terminal devices establish a connection in an infrastructure mode, introduction requests each specifying the saved unique identification information are transmitted to a server device, the server device transmits introduction responses each informing an address of the terminal device to the terminal devices which have transmitted an introduction request specifying the unique identification information of the communication counterparty, and the terminal devices carry out a communication for the game.

8 Claims, 7 Drawing Sheets

TERMINAL DEVICE, COMMUNICATION SYSTEM, TERMINAL METHOD AND INFORMATION MEMORY MEDIUM

CROSS-REFERENCE TO RELATED APPLICATION

This application claims the benefit of Japanese Patent Application No. 2009-038963, filed Feb. 23, 2009, the entire disclosure of which is incorporated by reference herein.

FIELD

This application relates generally to gaming devices, and more particularly, to a terminal device, a communication system, and terminal method that prevents a user from falling into trouble with unknown third persons, when the user advances a cooperative activity like a network game through a computer communication network.

BACKGROUND

Various gaming devices utilizing a wireless Local Area Network ("LAN") interface and a Network Interface Card ("NIC") have been proposed in the past. Many gaming devices, that allow friends to gather at one real location to play a network game, use ad-hoc communications. Alternatively, a user becomes acquainted with another user over the Internet and starts a network game together. In this case, the user connects to the Internet through a wireless LAN access point or the like, and becomes acquainted with another user through information from a server or through a chat room. In the latter case, many gaming devices make use of infrastructure communication.

In ad-hoc communication, a terminal device scans another terminal device arranged in the vicinity thereof, and they exchange unique identification information, such as a MAC address. The devices use the unique identification information as a communication identifier.

In contrast, in infrastructure communication, a terminal device receives an IP address dynamically assigned from a wireless LAN access point and communicates with a server device. The IP address of the server device is unchanged in many cases. The server device notifies the IP address of another terminal device to a terminal device. Note that a port number is also used as a communication identifier in addition to the IP address.

When a wireless LAN access point functions as a router, the router performs address/port number conversion. Through this process, a global IP address and a port number are assigned to a terminal device in addition to a local IP address.

For example, Japanese patent No. 3504654 discloses a gaming system using a network.

In network games or the like, however, a participant of the games is not limited to a friend of a user. Accordingly, it is desirable to effectively prevent the user from falling in trouble with an unknown third person.

In contrast, in a system like SNS (Social Network System) where friends expressly authorize one another, operational burden is large. In particular, when a user is a child like an elementary school student or a junior high school student, it is desired to reduce the operational burden of the user as much as possible. With such a desire being satisfied, it is further desirable that users who are friends one another should advances a cooperative activity, such as a communication game or chatting together at ease.

SUMMARY

The present application overcomes the foregoing problem, and it is an object of the present application to provide a terminal device, a communication system, a terminal method which can prevent a user from falling in trouble with an unknown third person when the user advances a cooperative activity like a network game through a computer communication network, and a computer-readable information memory medium storing a program which realizes those using a computer.

In order to achieve the object, the present application will be disclosed on the basis of the principle of the present application.

A terminal device according to a first aspect of the present application comprises a communication unit and an activity unit, and is structured as follows.

That is, the communication unit attempts a communication with another terminal device through a connection in a first communication mode or in a second communication mode.

In the first communication mode, communication is carried out with the terminal devices being located physically close to each other. Typically, the first communication mode is an ad-hoc mode. In the second communication mode, communication is carried out with the terminal devices being spaced apart. Typically, the second communication mode is an infrastructure mode.

In contrast, the activity unit communicates with another terminal device to advance a communication game together with another terminal device when the communication with another terminal device through a connection in the first communication mode is established.

That is, players using respective terminal devices advance the communication game while being located physically close to each other and directly meeting each other.

Furthermore, when a communication with another terminal device through the connection in the second communication mode is established and the terminal device and another terminal device have a history of game communication advancement, the activity unit advances the communication game together with another terminal device.

That is, in a situation in which players do not directly meet each other but play the game, the players can advance the communication game only with a "player who directly met in past times".

According to the present application, an opponent of a player in the communication game is limited to a person who directly met the player in past times and played the communication game together with the player. Accordingly, the player becomes not to play the communication game with an unknown third person. As a result, troubles among players can be suppressed.

A terminal device according to a second aspect of the present application communicates with a server device or another terminal device, comprises a communication unit, an activity unit, a memory unit, a request transmitting unit, a response receiving unit, and an address acquiring unit, and is structured as follows.

The communication unit attempts a connection in an ad-hoc mode or in an infrastructure mode with another terminal device, and, (a) identifies a communication counterparty between the terminal device and another terminal device through unique identification information of the communication counterparty in the ad-hoc mode when the connection is established in the ad-hoc mode, and (b) identifies a communication counterparty between the terminal device and another terminal device through unique identification information of the communication counterparty and an address assigned to the communication counterparty in a computer communication network in the infrastructure mode when the connection is established in the infrastructure mode.

The ad-hoc mode configures a small-size communication network. For example, a NetBios Extended User Interface ("NETBEUI") protocol is used in the ad-hoc mode. The terminal devices exchange respective unique identification information each other, and identify a destination and a transmission originator using those unique identification information. According to NETBEUI, a machine name is used in order to simply distinguish a destination and a transmission originator. However, a Media Access Control ("MAC") address may be used as unique identification information.

In contrast, the infrastructure mode configures a large-scale communication network. For example, a Transmission Control Protocol/Internet Protocol ("TCP/IP") protocol is used in the infrastructure mode. The terminal device and the server device distinguish a destination and a transmission originator using an address assigned individually. Note that unique identification information of a communication device may be used. Typically, an IP address is used as the address. When communication is carried out through a router, a set of an IP address and a port number may be used as the address.

The activity unit exchanges activity information to and from another terminal device that becomes available to advance a cooperative activity based on an instruction from a user when a connection is established in the ad-hoc mode or the infrastructure mode.

The cooperative activity is various kinds of activities utilizing the terminal devices. Typical examples of such an activity are a game, a chat, and exchange of various kinds of messages utilizing a communication function.

First, the communication unit acquires unique identification information or an address identifying a communication counterparty terminal device. Thereafter, the communication unit performs communication using such unique identification information or an address, and executes the cooperative activity like a network game between plural users.

The memory unit stores the unique identification information of another terminal device that advances the cooperative activity together with the terminal device when a connection in the ad-hoc mode with another terminal device is established.

When the ad-hoc mode is established, a communication counterparty terminal device is located physically close, and it is possible to meet the user thereof. According to the present application, when a connection is established, a communication counterparty is regarded as a friend in some kind A list of friends is created in the memory unit. More specifically, when the unique identification information of the communication counterparty terminal device is stored in the memory unit, the communication counterparty is regarded as a friend.

The request transmitting unit transmits an introduction request to the server device when a connection in the infrastructure mode is established with another terminal device.

The server device corresponds to a lobby server in network games, and introduces the terminal devices with each other. A lobby server means a server which brings the players having a purpose of executing a game cooperatively together. Lobby servers often have various functions, such as hosting of a chat, posting of news and information, and selling of a product.

An unchanged address is assigned to the server device or the address thereof is searchable through a technique like Domain Name System ("DNS"). When the terminal device can be connected to the computer communication network in the infrastructure mode, the terminal device can communicate with the server device.

In the infrastructure mode, packets contain address information of a transmission originator of the packets and unique identification information thereof because of the protocol rule. Accordingly, the server device can acquire an address usable for communication with the terminal device which has transmitted an introduction request. Note that the address of the terminal device acquired by the server device is transmitted to a communication counterparty to be introduced by the server device.

When those foregoing information is not requisite because of the protocol rule, those information are specified when the terminal device requests introduction, and notified to the server device.

The response receiving unit receives an introduction response which is transmitted from the server device and specifies a pair of unique identification information of another terminal device having transmitted an introduction request to the server device and an address of another terminal device in the computer communication network.

That is, the introduction response in the cooperative activity like the network game contains information of a communication counterparty candidate. Unique identification information and a current address are acquired as information of the communication counterparty.

The address acquiring unit acquires an address included in a pair, having unique identification information of another terminal device that matches unique identification information stored in the memory unit, among pairs specified in the introduction responses.

That is, the terminal device selects out another terminal device with which a communication was established in past times in the ad-hoc mode. Thereafter, the terminal device acquires an address currently used by another terminal device. The acquired address is assumed to be an address of a terminal device used by a friend.

In contrast, the communication unit (c) enables a communication with another terminal device based on the unique identification information of another terminal device acquired at connection establishment when a connection is established in the ad-hoc mode, and (d) enables a communication with another terminal device based on the acquired address when a connection is established in the infrastructure mode.

In this fashion, the activity unit starts executing a process in accordance with establishment of a communication between the terminal device and another terminal device.

According to the present application, a terminal device of a communication counterparty who was located physically close and had a cooperative activity in past times is automatically registered. Therefore, when a terminal device performs communication through a computer communication network, the cooperative activity is advanced only with registered another terminal device. As a result, it is possible to prevent a user from falling in trouble with an unknown third person.

According to the terminal device of the present application, unique identification information stored in the memory unit is further specified in the introduction request, and the server device specifies a pair of unique identification information of another terminal device, having unique identification information matching unique identification information specified in an introduction request transmitted from the terminal device, among other terminal devices each transmitted an introduction request to the server device, and an address of another terminal device in the computer communication network in an introduction response.

According to the foregoing structure of the present application, the server device can specify all of the other terminal devices requesting an introduction currently in an introduction response. However, according to the present application, the introduction request contains unique identification information of transmission originator and unique identification information of a "friend". Therefore, the server device can selects only the address of the "friend" user of the terminal device, and specify it in the introduction response.

According to the present application, information of an unknown third person is not contained in an introduction response. As a result, the communication efficiency improves. Moreover, the privacy of the user can be protected.

According to the terminal device of the present application, unique identification information of another terminal device among other terminal devices each having unique identification information stored in the memory unit is erased from the memory unit after a predetermined period elapses since the communication unit established a communication in the ad-hoc mode and became available for communication.

In the ad-hoc mode, a plurality of users gather physically same place and play a network game or the like. Thereafter, as a predetermined time elapses, the users become unable to play the network game together over the computer communication network.

According to the present application, it is possible to prod the users of respective terminal devices to directly gather and meet one another and to carry out a cooperative activity. As a result, any troubles among the users can be further suppressed.

According to the terminal device of the present application, when a communication with another terminal device through the communication unit is disabled, the activity unit saves a state of the cooperative activity in association with unique identification information of another terminal device, and when a communication with another terminal device is re-enabled, the activity unit restores the state of the cooperative activity saved in association with the unique identification information of another terminal device which becomes available for communication, and continues the cooperative activity.

For example, the terminal device communicates with another terminal device and executes the network game together. At this time, the terminal device saves a state of the game in association with the unique identification information of another terminal device which is a communication counterparty. After interruption of communication, and a connection with the communication counterparty is established again, the terminal device loads the saved state of the game, and restarts the game from a part where the user left off the game.

For example, when the terminal device carries out cooperative activities together with a plurality of individual other terminal devices, a cooperative activity with a certain terminal device may be interrupted. According to the present application, when the terminal device establishes a connection with such another terminal device, the terminal device can automatically restart the interrupted cooperative activity.

According to the terminal device of the present application, the unique identification information is a Media Access Control ("MAC") address and the address is an Internet Protocol ("IP") address and a port number, and the communication unit establishes a connection in the infrastructure mode as a temporal IP address is dynamically assigned thereto.

The present application relates to a preferred embodiment, and can be easily embodied using widely used communication protocols.

A communication system according to a third aspect of the present application comprises a plurality of foregoing terminal devices and a server device that communicates with the terminal devices.

The server device comprises a request receiving unit and a response transmitting unit.

The request receiving unit receives an introduction request transmitted from any of the plurality of terminal devices.

As explained above, in the introduction request, the unique identification information of a transmission-originator terminal device and the unique identification information of a terminal device which is a "friend" of the transmission-originator terminal device. As receiving the introduction request, the server device acquires an address of the transmission-originator terminal device from the packets of the introduction request.

When in any two introduction requests among all received introduction requests, (p) unique identification information specified in one introduction request matches unique identification information of a second terminal device which has transmitted another introduction request, and (q) unique identification information specified in another introduction request matches unique identification information of one of the plurality of terminal devices which has transmitted the one introduction request, the response transmitting unit (r) transmits an introduction response specifying a pair of unique identification information of the second terminal device which has transmitted another introduction request and an address of a transmission originator of another introduction request to the one of the plurality of terminal devices, and (s) transmits an introduction response specifying a pair of unique identification information of the one of the plurality of terminal devices which has transmitted the one introduction request and an address of a transmission originator of the one introduction request to the second terminal device.

That is, addresses of the communication counterparties are notified to the terminal devices recognized as "friends" with each other.

According to the present application, terminal devices which were located physically close to each other and carried out a cooperative activity in past times are introduced, respectively. Therefore, it is possible to prevent a user from fall in trouble with an unknown third person.

A method for game communication and advancement according to a fourth aspect of the present application comprises a communication step and an activity step executed by a terminal device including a communication unit and an activity unit, and comprises as follows.

That is, in the communication step, the communication unit attempts a communication with another terminal device through a connection in a first communication mode or in a second communication mode.

In contrast, in the activity step, when a communication with another terminal device is established through a connection in the first communication mode, the activity unit communicates with another terminal device to advance a communication game together with another terminal device.

Furthermore, in the activity step, when a communication with another terminal device through a connection in the second communication mode is established and the terminal device and the second terminal device have a history of game communication advancement, the activity unit advances the communication game together with another terminal device.

A terminal method according to a fifth aspect of the present application comprises a communication step, an activity step, a memory step, a request transmitting step, a response receiving step, and an address acquiring step all of which are executed by a terminal device which communicates with a server device or another terminal device and which includes a communication unit, an activity unit, a memory unit, a request transmitting unit, a response receiving unit, and an address acquiring unit, and the method comprises as follows.

In the communication step, the communication unit attempts a connection in an ad-hoc mode or in an infrastructure mode with another terminal device and another terminal device, the communication unit (a) identifies a communication counterparty between the terminal device and another terminal device through unique identification information of the communication counterparty in the ad-hoc mode when the connection is established in the ad-hoc mode, and (b) identifies a communication counterparty between the terminal device and another terminal device through unique identification information of the communication counterparty and an address assigned to the communication counterparty in a computer communication network in the infrastructure mode when the connection is established in the infrastructure mode.

In the activity step, the activity unit exchanges activity information to and from another terminal device that becomes available to advance a cooperative activity based on an instruction from a user when the connection is established in the ad-hoc mode or the infrastructure mode.

In the memory step, the memory unit stores the unique identification information of another terminal device that advances the cooperative activity together in the activity step when a connection in the ad-hoc mode is established in the communication step.

In the request transmitting step, the request transmitting unit transmits an introduction request to the server device when a connection in the infrastructure mode is established with another terminal device in the communication step.

In contrast, in the response receiving step, the response receiving unit receives an introduction response which is transmitted from the server device and which specifies a pair of unique identification information of another terminal device having transmitted an introduction request to the server device and an address of another terminal device in the computer communication network.

In the address acquiring step, the address acquiring unit acquires an address included in a pair, having unique identification information of another terminal device that matches unique identification information stored in the memory unit in the memory step, among pairs specified in the introduction responses.

In the communication step, (c) a communication with another terminal device is enabled based on the unique identification information of another terminal device acquired at a time of connection establishment when the connection is established in the ad-hoc mode in the communication step, and (d) a communication with another terminal device is enabled based on an acquired address when the connection is established in the infrastructure mode.

An information memory medium to a sixth aspect of the present application stores a program which allows a computer to function as the foregoing terminal device.

The information memory medium of the present application can be a computer-readable information memory medium, such as a compact-disc, a flexible disc, a hard disk, a magnet-optical disk, a digital video disc, a magnet tape or a semiconductor memory.

The foregoing information memory medium can be distributed and sold independently from the computer.

According to the present application, there are provided a terminal device, a communication system, a terminal method which can prevent a user from falling in trouble with an unknown third person when the user advances a cooperative activity like a network game through a computer communication network, and a computer-readable information memory medium storing a program which realizes those using a computer.

BRIEF DESCRIPTION OF THE DRAWINGS

A more complete understanding of this application can be obtained when the following detailed description is considered in conjunction with the following drawings, in which.

DETAILED DESCRIPTION

An explanation will be given of an embodiment further below. The explanation will be given of the embodiment by disclosing a gaming information processing device to facilitate understanding, but the following embodiment is merely for explanation, and is not for limiting the scope of the present application.

Accordingly, those skilled in the art can adopt embodiments in which individual or whole constituent elements are replaced with equivalents. It should be understood that such embodiments are included in the scope of the present application.

Figure 1:
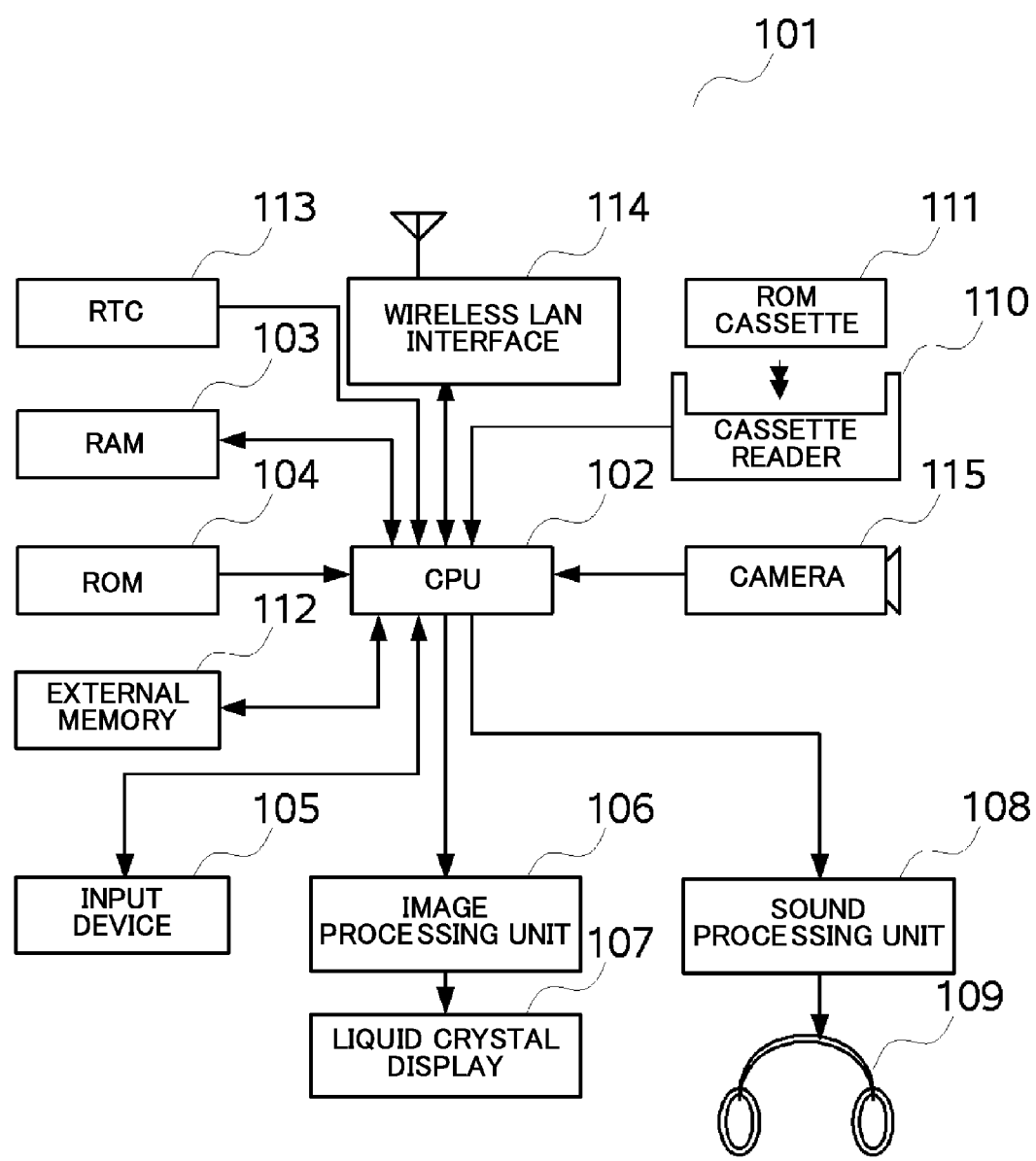
FIG. 1 is a schematic diagram showing an illustrative structure of a typical information processing device.

FIG. 1 is a schematic diagram showing an illustrative structure of a typical information processing device. An information processing device 101 may function as a terminal device 231 by running a program. An explanation will be given with reference to this figure.

The information processing device 101 shown in the figure is preferably a portable multimedia terminal. The information processing device 101 may be implemented, for example, using a Central Processing Unit ("CPU") 102, a Random Access Memory ("RAM") 103, a Read Only Memory ("ROM") 104, an input device 105, an image processing unit 106, a liquid crystal display 107, a sound processing unit 108, a headphone 109, a cassette reader 110, a ROM cassette 111, an external memory 112, a Real Time Clock ("RTC") 113, a wireless LAN (Local Area Network) interface 114, and a camera 115.

In order to realize the terminal device 231 of the embodiment, a user may load the ROM cassette 111, storing a program of the embodiment, in the information processing device 101.

The CPU 102 preferably controls individual units of the information processing device 101, and executes various arithmetic and determination processes.

First, the user may power on the information processing device 101. The CPU 102 may execute an Initial Program Loader ("IPL") recorded in the ROM 104. Through this process, the CPU 102 may shift the process to the program recorded in the ROM cassette 111. Note that the ROM cassette 111 may be electrically connected to the CPU 102 through the cassette reader 110.

In general, the information processing device 101 may execute a game program and a multimedia information reproduction program provided through ROM cassette 111. However, such programs may be stored in the ROM 104 beforehand.

Moreover, the ROM 104 preferably stores a Basic Input Output System ("BIOS") program beforehand. BIOS may control the input device 105, the image processing unit 106, and the sound processing unit 108.

The RAM 103 is an area that may be used for storing temporal information. The external memory 112 is an area that may be used for storing nonvolatile information. In general, devices, such as a hard disk device, mounted in the information processing device 101 may be used as the external memory 112. Note that, various kinds of memory cards may be used as the external memory 112, such as, for example, memory cards loaded releasably in information processing device 101.

In general, input device 105 may be made up of various buttons, keyboards, mouse, and joysticks. However, a touch screen integrally formed with the liquid crystal display 107 may be used as the input device 105.

The image processing unit 106 may cause the liquid crystal display 107 to display various kinds of character information and image information under the control of the CPU 102. In general, image processing unit 106 may reflect pixel information in each pixel of the liquid crystal display 107 for each vertical synchronization interruption period (typically, $\frac{1}{30}$ second or $\frac{1}{60}$ second or so). The pixel information is stored in a flame buffer prepared in the RAM 103.

In general, a user may first move a cursor displayed on the liquid crystal display 107 by operating a movement button of the input device 105 at the time of inputting an instruction. Next, the user may superimpose the cursor on a desired menu item, and selects the menu item by pressing a set button. Note that when the user inputs an instruction through a touch screen, no cursor is used. Moreover, the menu item is not limited to one always displayed on the liquid crystal display 107. For example, each individual button of the input device 105 may serve different functions.

The sound processing unit 108 preferably outputs sound data stored in the RAM 103, the ROM 104, the ROM cassette 111, and the external memory 112 to the headphone 109. Examples of sound data used are Pulse Code Modulation ("PCM") data and Mpeg audio layer-3 ("MP3") data. As would be understood by one of ordinary skill in the art, PCM data is digitized sound waveform data. Moreover, MP3 is compressed PCM data. Note that data defining a pitch, a sound length, a volume, and tone, such as, for example, Music Instruction Data Interface ("MIDI") data may be used. In this case, predetermined sound-source waveform data may be appropriately selected, modified, and reproduced.

The RTC 113 preferably measures current date and hour. In general, when the information processing device 101 is used for the first time, the RTC 113 preferably adjusts the time of the information processing device 101. The RTC 113 may automatically adjust a time. In this case, the RTC 113 may connect to an NTP (Network Time Protocol) server through the wireless LAN interface 114.

Moreover, the RTC 113 may further have a function of initiating an alarm interruption. In this case, as a set time comes, the RTC 113 preferably triggers an alarm interruption. At this time, the CPU 102 preferably temporarily stops a program currently run, preferably executes a preset interruption handler, and then preferably restarts running the interrupted program.

The wireless LAN interface 114 preferably connects to the Internet through a wireless LAN access point prepared at a home, a company, and a street corner. Moreover, the wireless LAN interface 114 preferably establishes an ad-hoc communication channel with another information processing device 101 located in the vicinity thereof, and preferably executes communication one by one.

The camera 115 preferably acts as a digital camera through the information processing device 101. Image-pickup device technology, such as, for example, a Charge Coupled Device ("CCD") and a Complementary Metal Oxide Semiconductor ("CMOS") may be applied to the camera 115. A picked-up image preferably temporarily expands in the RAM 103, and preferably stores in the external memory 112.

A business computer, a cellular phone device, a Personal Data Assistant ("PDA"), a portable gaming device, a multi-functional television device, a Digital Versatile Disc ("DVD") player, a portable music player and the like may be used as the information processing device 101 which realizes the terminal device 231 of the present application.

Figure 2:
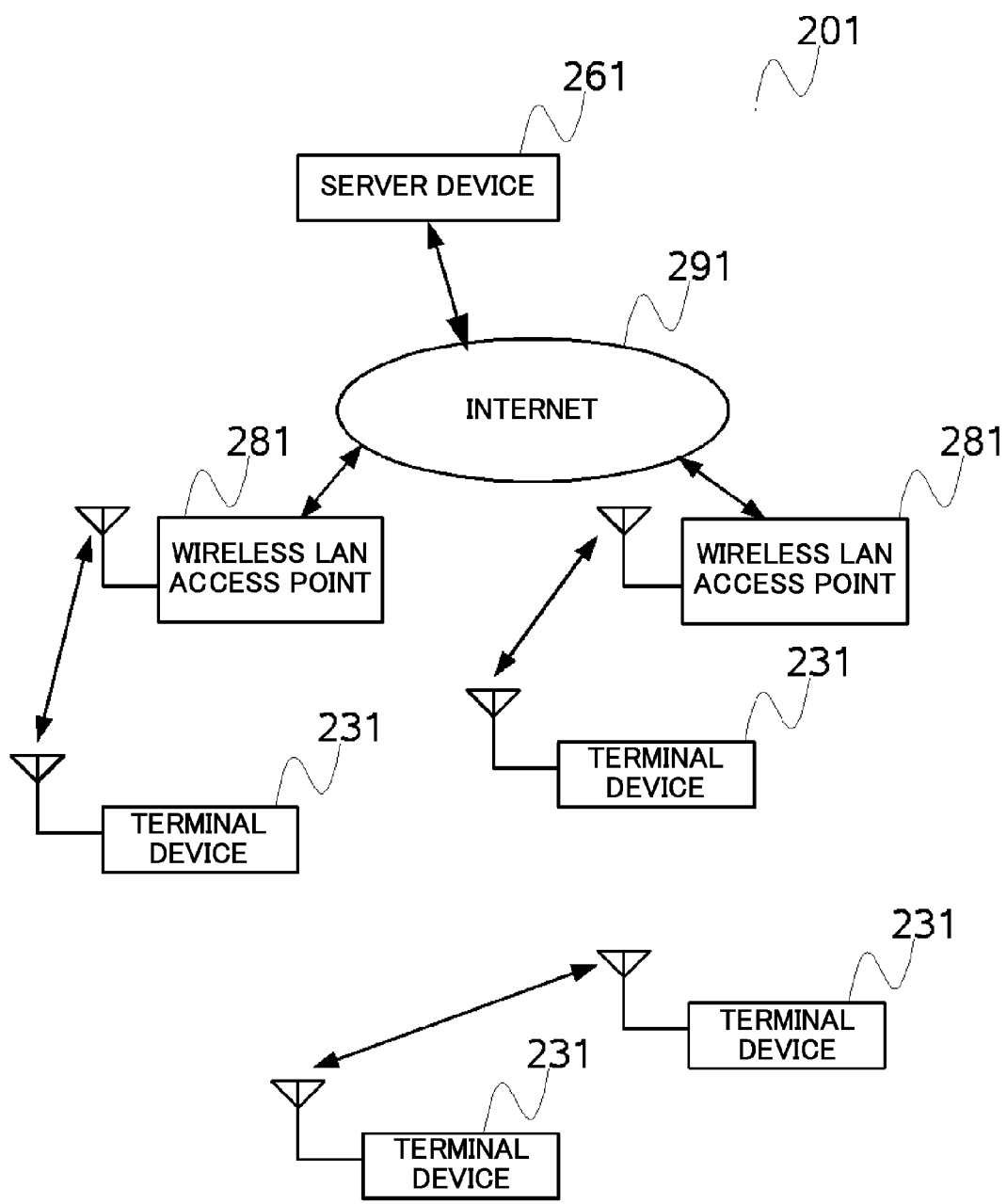
FIG. 2 is a schematic diagram showing an illustrative structure of a communication system according to an embodiment of the present application.

FIG. 2 is a schematic diagram showing an illustrative structure of a communication system according to an embodiment of the present application. The subsequent explanation of this structure will refer to this figure.

A communication system 201 may be implemented, for example, using a plurality of terminal devices 231 and a server device 261. The terminal device 231 may be configured by the portable information processing device 101. The terminal device 231 preferably functions as a gaming device adapted for wireless communication.

In an ad-hoc mode, the terminal devices 231 preferably directly communicate with each other. As the plurality of terminal devices 231 execute a game in ad-hoc mode, the terminal devices 231 are deemed "friends".

The server device 261 comprises the information processing device 101 for server purposes. The server device 261 preferably functions as a lobby server and a matching server for gaming devices compatible with wireless communication. First, the server device 261 preferably starts communication with the terminal devices 231. The terminal devices 231 preferably establish a connection in an infrastructure mode. Next, the server device 261 preferably notifies respective IP addresses (and port numbers) of counterparties to the "friend" terminal devices 231, and introduces those terminal devices 231 to each other.

The terminal devices 231 that were introduced to each other initiate peer-to-peer communication and execute a game. At this time, the terminal devices 231 perform communication through respective wireless LAN access points 281 used by individual terminal devices 231 and the Internet 291.

As explained above, in the infrastructure mode, the wireless LAN access point 281 preferably establishes communication/connection with the Internet 291. According to the embodiment, only "friends" are preferably introduced each other in such a game environment. Therefore, it is possible to prevent the user from falling into trouble with an unknown third person.

Figure 3:
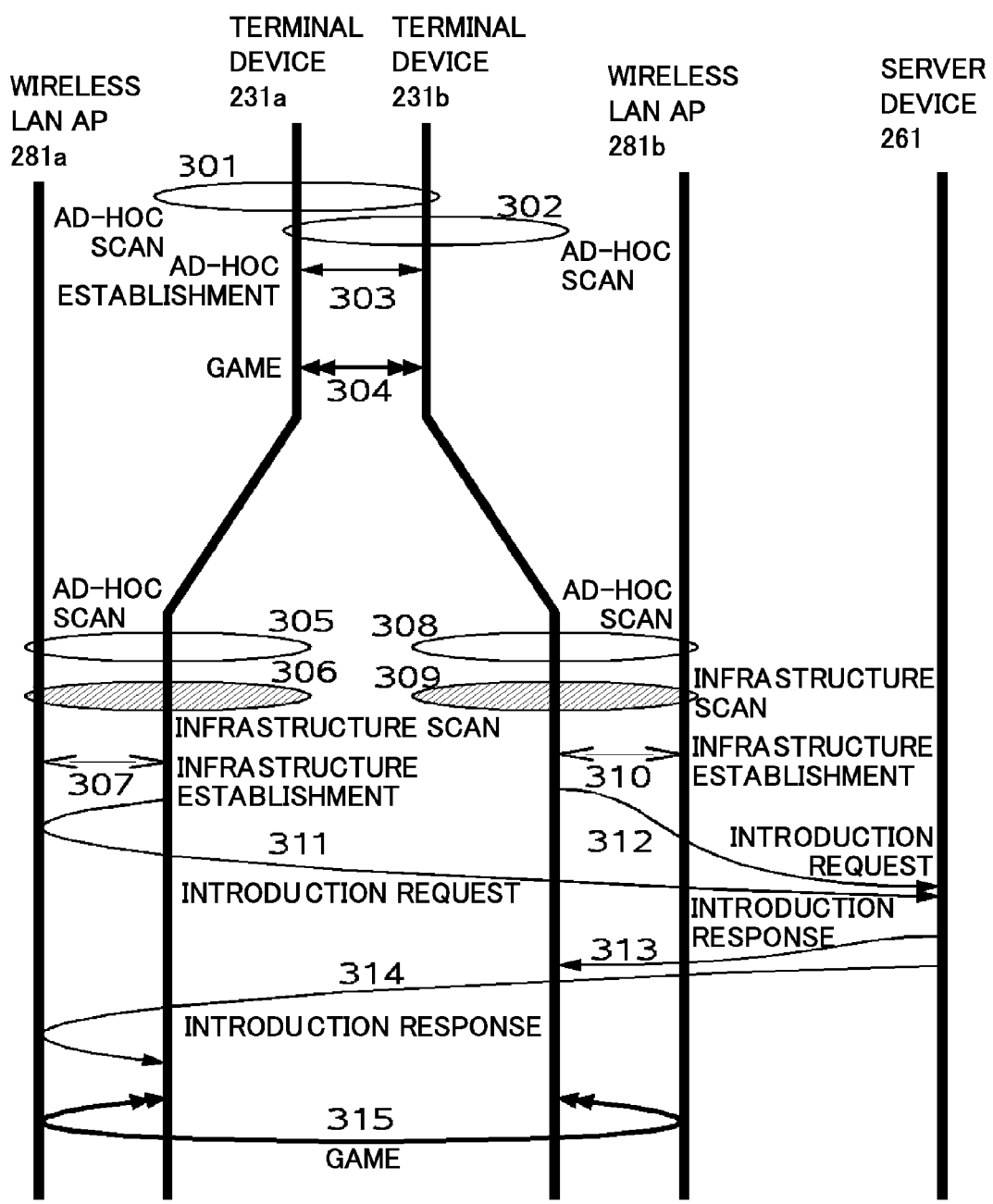
FIG. 3 is an illustrative session diagram showing how communication is preferably carried out in the communication system of the embodiment.

FIG. 3 is a session diagram showing how an embodiment executes the communication system. The following explanation will make reference to this figure. Note that the time axis shown in FIG. 3 progresses from top to bottom.

First, a terminal device 231a and a terminal device 231b may be located physically close to each other. In FIG. 3, terminal device 231a is preferably powered on before subsequently powering on terminal device 231b.

That is, first, a user preferably turns on the terminal device 231a. Next, the terminal device 231a preferably starts scanning an ad-hoc communication (301). Subsequently, the other user preferably turns on the terminal device 231b. Thereafter, the terminal device 231b preferably starts scanning an ad-hoc communication (302).

The terminal device 231a and the terminal device 231b preferably acknowledge that they are in proximity to each other via scanning 301 and 302. Next, both terminals preferably establish a communication in an ad-hoc mode (303). At this time, MAC addresses, which are mutually unique identifiers, are preferably exchanged. Thereafter, communication for a network game is preferably performed (304).

Eventually, the game in the terminal device 231a and the terminal device 231b ends. At this stage, it is assumed that the individual users go back home.

Under these circumstances, as the terminal device 231a is powered on, the terminal device 231a begins scanning an ad-hoc communication (305). In this case, no terminal device 231 would be available for communication. Therefore, the terminal device 231a starts scanning an infrastructure communication (306). As a result, the terminal device 231a finds a wireless LAN access point 281a and establishes a communication in the infrastructure mode (307).

At this time, an IP address is preferably assigned to the terminal device 231a. The IP address may be a global IP address, or, if the wireless LAN access point 281a performs address conversion or the like, the IP address may be a local address.

Likewise, when the terminal device 231b is powered on, the terminal device 231b starts scanning an ad-hoc communication (308). Because no other terminal device would be available for communication, scanning of an ad-hoc communication would fail. In contrast, scanning of an infrastructure communication (309) would succeed, which establishes a communication in the infrastructure mode (310). An IP address is assigned to the terminal device 231b.

The terminal device 231a and the terminal device 231b preferably establish a communication in the infrastructure mode. Thereafter, each of the terminal devices 231a, 231b preferably transmits an introduction request to the server device 261 (311, 312).

Unique identification information of the terminal device 231a, 231b and unique identification information of the "friend" terminal device 231 are preferably specified in the introduction request. A "friend" of terminal device 231a is preferably terminal device 231b, that has had ad-hoc communications with terminal device 231a in the past. That is, terminal 231a is a "friend" of terminal 231b. Packets of the introduction request arrive from the terminal device 231a, 231b to the server device 261. As a result, the server device 261 becomes acquainted with the IP address of the originating transmitter of the packets.

The terminal device 231a, 231b transmits an introduction request, which contains unique identification information of the other terminal device, specifying that the other terminal device is a "friend" to the server device 261. Thereafter, the server device 261 transmits an introduction response specifying unique identification information of the "friend" and the IP address thereof to the terminal devices 231a, 231b (313, 314).

Having acquired the IP address of the communication counterparty from the introduction response, the terminal devices 231a, 231b perform peer-to-peer communication with each other using those IP addresses and execute a game (315).

Figure 4:
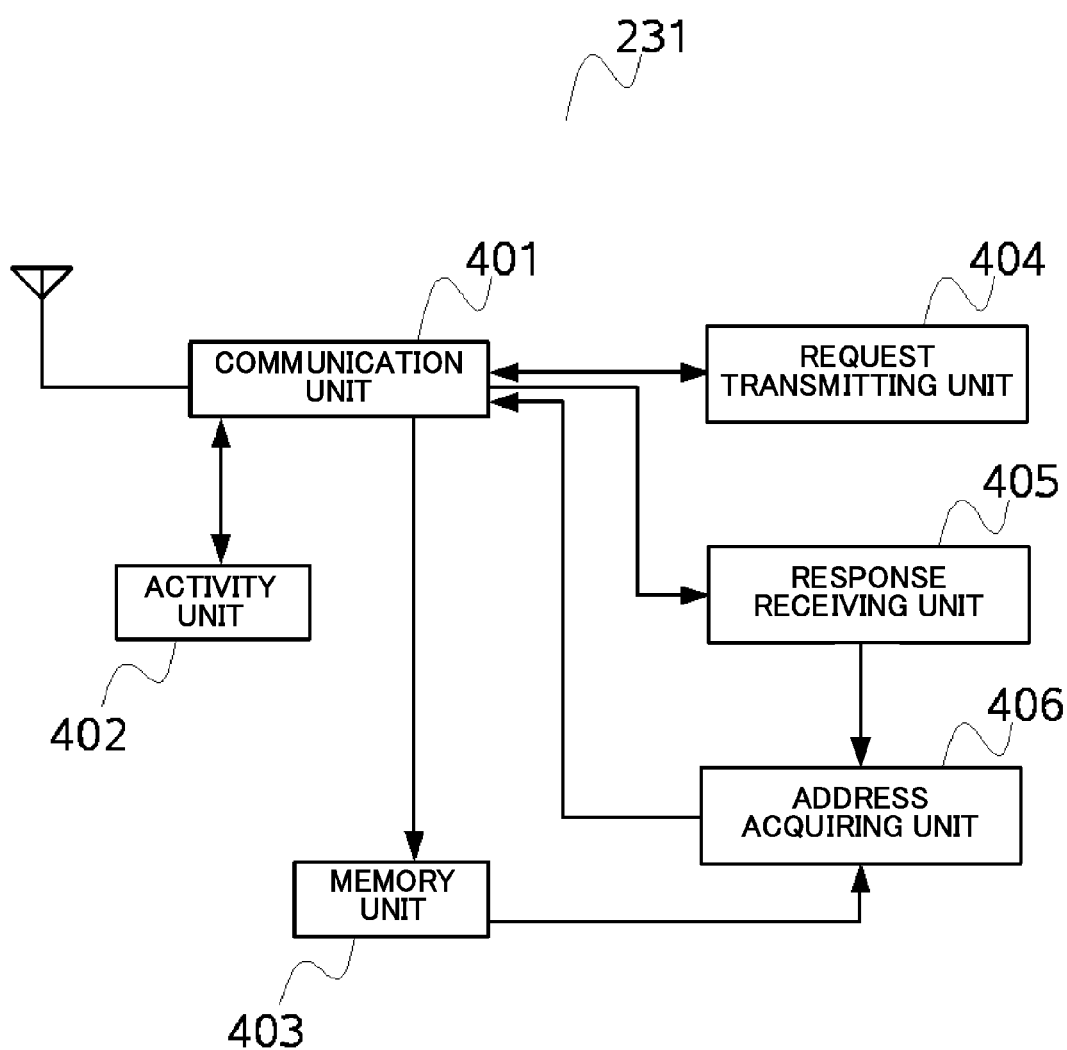
FIG. 4 is a block diagram showing an illustrative structure of a terminal device according to the embodiment.

FIG. 4 is a block diagram showing a general structure of the terminal device 231 of an embodiment. The following explanation will refer to this figure.

The terminal device 231 preferably includes a communication unit 401, an activity unit 402, a memory unit 403, a request transmitting unit 404, a response receiving unit 405, and an address acquiring unit 406.

The communication unit 401 preferably attempts communication in the ad-hoc mode or in the infrastructure mode. The communication unit 401

(a) preferably identifies a communication counterparty between the terminal device and another terminal device through unique identification information of the communication counterparty in the ad-hoc mode when the connection is established in the ad-hoc mode, and (b) preferably identifies a communication counterparty between the terminal device and another terminal device through unique identification information of the communication counterparty and an address assigned to the communication counterparty in a computer communication network in the infrastructure mode when the connection is established in the infrastructure mode.

Therefore, the wireless LAN interface 114 preferably functions as the communication unit 401.

As explained above, the ad-hoc mode configures a small-sized communication network. For example, a NETBEUI protocol may be used in the ad-hoc mode. The terminal devices 231 exchange respective unique identification information with each other, and distinguish a destination and a transmission originator based on the exchanged unique identification information. The NETBUI protocol generally uses a machine name to easily distinguish a destination and a transmission originator. However, a MAC (Media Access Control) address may also be used as the unique identification information.

In contrast, the infrastructure mode preferably configures a large-scale communication network. For example, a TCP/IP protocol may be used in the infrastructure mode. The terminal device 231 and the server device 261 preferably distinguish a destination and a transmission originator using an assigned address. It is possible to refer unique identification information of a communication device. Typically, an IP address is used as the address. When a router or the like intervenes, a set of an IP address and a port number may be used as the address.

When the terminal device 231 is available for communication with another terminal device 231, the terminal devices 231 preferably establishes a connection in the ad-hoc mode or the infrastructure mode through respective communication units 401. Thereafter, the activity unit 402 preferably exchanges activity information to and from another terminal device 231 that is available for communication based on instructions from the user, and preferably advances a cooperative activity.

Accordingly, the CPU 102 preferably works together with the input device 105, the liquid crystal display 107, the RAM 103, and the wireless LAN interface 114 to function as the activity unit 402. Note that the input device 105 preferably receives input through an instruction of the user. The liquid crystal display 107 preferably displays the progress status of the game under the control of the image processing unit 106. The RAM 103 preferably stores a temporal process result.

Through establishment of the connection, the activity unit 402 preferably acquires unique identification information or an address for identifying a communication counterparty terminal device 231. Thereafter, the terminal device 231 preferably communicates using the unique identification information or the address, and preferably advances a cooperative activity, such as a network game, by users.

Moreover, the communication unit 401 preferably establishes a connection in the ad-hoc mode. Thereafter, the memory unit 403 preferably stores unique identification information of another terminal device 231. Note that another terminal device 231 is preferably a terminal device 231 which has advanced the cooperative activity through the activity unit 402.

Accordingly, under the control of the CPU 102, the external memory 112 preferably functions as the memory unit 403.

Establishment of the ad-hoc mode means that a communication counterparty terminal device 231 is in physical proximity to the terminal device 231. Accordingly, a user can directly meet a user of the communication counterparty terminal device 231. Thus, the user of the communication counterparty terminal device 231 is possibly a "friend". When the users are friends with each other, the memory unit 403 preferably stores unique identification information of the terminal device 231. Accordingly, the external memory 112 must be a nonvolatile memory device.

Moreover, the communication unit 401 may establish a communication in the infrastructure mode. In the infrastructure mode, the request transmitting unit 404 preferably transmits an introduction request to the server device 261.

Accordingly, the CPU 102 works together with the wireless LAN interface 114 to preferably function as the request transmitting unit 404.

As explained above, the server device 261 preferably corresponds to a lobby server of the network game. That is, the server device 261 preferably acts as an introducer among the terminal devices 231.

An unchanged address may be assigned to the server device 261, or means for searching an address such as a DNS address is preferably provided. The terminal device 231 may communicate with the server device 261 after becoming available to the computer communication network in the infrastructure mode.

In the infrastructure mode, because of the protocol rule, packets must contain address information of the transmission originator and unique identification information thereof. Accordingly, the server device 261 may acquire an address, which may be used for communication. The address acquired by the server device 261 is preferably an address of the terminal device 231, which has transmitted an introduction request. Such an address is preferably transmitted to the communication counterparty of the terminal device 231. Note that the server device 261 introduces the communication counterparty to the terminal device 231.

The foregoing information is not requisite and instead depends on a protocol. In this case, the server device 261 may acquire the foregoing information from an instruction in the introduction request from the terminal device 231.

Furthermore, the response receiving unit 405 preferably receives an introduction response. The server device 261 preferably transmits the introduction response. In the introduction response, a pair of unique identification information of another terminal device 231 that has transmitted an introduction request to the server device 261 and the address of another terminal device 231 in the computer communication network is preferably provided.

Accordingly, the CPU 102 works together with the wireless LAN interface 114 to preferably function as the response receiving unit 405.

That is, the introduction response preferably contains a candidate of the communication counterparty. Note that it is assumed that the communication counterparty and the user carry out the cooperative activity like the network game. Unique identification information and a current address are preferably acquired as the information of the communication counterparty.

Furthermore, the address acquiring unit 406 acquires an address from the pair specified in the introduction response. It is preferable that the unique identification information of another terminal device 231 contained in such pair match unique identification information stored in the memory unit 403.

Accordingly, the CPU 102 works together with the external memory 112 and the wireless LAN interface 114 to preferably function as the address acquiring unit 406.

That is, first, the address acquiring unit 406 preferably selects a terminal device 231 with which the address acquiring unit 406 has a history of establishing a communication in ad-hoc mode. Next, the address acquiring unit 406 preferably acquires an address currently used by such a terminal device 231. This address may be the address of a terminal device 231 being used by a "friend".

The communication unit 401
(c) preferably enables a communication with another terminal device 231 based on the unique identification information of the second terminal device acquired at connection establishment, when the connection is established in the ad-hoc mode, and
(d) preferably enables a communication with another terminal device 231 based on the acquired address when the connection is established in the infrastructure mode.

Communications with another terminal device 231 may be established in the foregoing way. Next, the activity unit 402 preferably starts a process.

According to the embodiment, the communication counterparty terminal device 231 having a history of cooperative activity and located in physical proximity to a terminal device 231 is automatically registered. Accordingly, when the terminal device 231 performs communication through the computer communication network, such a terminal device 231 preferably carries out a cooperative activity only with a registered communication counterparty terminal device 231. As a result, it is possible to prevent the user from falling into trouble with an unknown third person.

According to an embodiment of the terminal device 231, as explained above, a MAC address is preferably used as the unique identification information; and, an IP address and port number are used as the address. Moreover, a temporal IP address is preferably dynamically assigned to the terminal device 231. The communication unit 401 preferably establishes a communication in the infrastructure mode using this IP address. Widely used communication protocols may be utilized. Therefore, an embodiment of the present application can be readily practiced.

Figure 5:
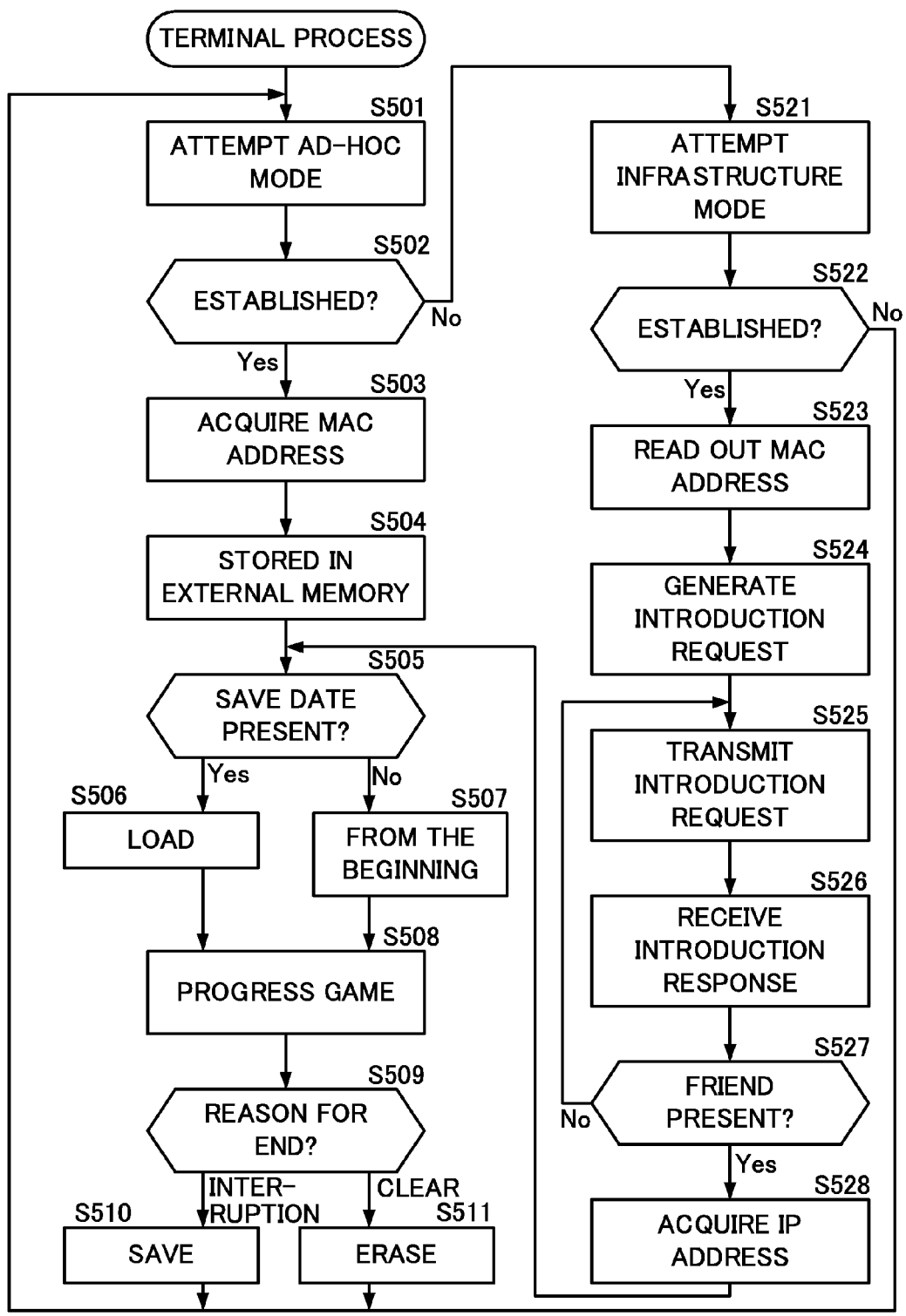
FIG. 5 is a flowchart showing a preferred series of steps for a terminal process executed by an information processing device realizing the terminal device.

FIG. 5 is a flowchart showing a flow of the control of a terminal process. Note that the terminal process is preferably executed by the information processing device 101, which preferably realizes the terminal device 231. An explanation will now be given with reference to this flowchart.

First, the user may turn on the information processing device 101. Next, the terminal process may be started. The CPU 102 preferably drives the wireless LAN interface 114 to attempt a connection in the ad-hoc mode in step S501.

When the communication unit 401 succeeds to establish a connection in the ad-hoc mode (step S502; Yes), the address acquiring unit 406 preferably acquires the MAC address of a communication counterparty from the information gathered at the time of connection in step S503. Thereafter, the activity unit 402 preferably stores the MAC address of the communication counterparty as a "friend" in the external memory 112, in step S504.

Next, if the external memory 112 stores save data corresponding to the acquired MAC address (step S505; Yes), the data is loaded in an area of the RAM 103 for use in, for example, games in step S506. The game enters a continuable state. Conversely, if no save data is stored (step S505; No), the activity unit 402 clears the game area in the RAM 103 and the game starts from the beginning in step S507.

Thereafter, the activity unit 402 preferably identifies a communication counterparty based on the MAC address acquired in the step S503, and preferably progresses the game in step S508. Note that the communication counterparty would have already established a connection through the communication unit 401. At this time, various technologies relating to network games may be applied.

Furthermore, the activity unit 402 preferably checks if there is a reason for ending the game in step S509. If the game ends because of interruption (step S509; Interruption), the activity unit 402 preferably sets save data to be the current contents of the game area in RAM 103. Next, the activity unit 402 preferably stores the save data in the external memory 112 in association with the MAC address of the communication counterparty in step S510. Thereafter, the process preferably returns to step S501.

When the game ends because of completion thereof (step S509; Clear), the activity unit 402 preferably erases save data stored in the external memory 112 in association with the MAC address of the communication counterparty in step S511. Thereafter, the process preferably returns to step S501.

As explained above, when communication with another terminal device 231 through communication unit 401 becomes unstable, the activity unit 402 preferably saves a state of the cooperative activity in association with the unique identification information of another terminal device 231 in step S510. In contrast, when communication with another terminal device 231 becomes possible, the activity unit 402 recovers the state of the cooperative activity through the steps S505 to S508, and continues the cooperative activity. As explained above, the activity unit 402 saves the state of the cooperative activity associated with the unique identification information of another terminal device 231.

That is, the activity unit 402 preferably saves the state of the game in association with the unique identification information of the communication counterparty executing the network game together. The communication unit 401 preferably establishes a communication with the communication counterparty. Next, the activity unit 402 preferably loads the saved state of the game, and preferably continues the game from where the user left off.

Accordingly, while the activity unit 402 is carrying out the cooperative activity with a plurality of individual counterparties, an interruption may occur between the activity unit 402 and a particular counterparty. After that, when communication with the communication counterparty is reestablished, the activity unit 402 may automatically restart the interrupted cooperative activity.

In contrast, when no connection in the ad-hoc mode is established (step S502; No), the CPU 102 preferably attempts a connection in the infrastructure mode via the wireless LAN interface 114 in step S521.

As a result of the step S521, when establishment of a connection in the infrastructure mode succeeds (step S522; Yes), the activity unit 402 preferably reads out a MAC address stored in the external memory 112 as a "friend" in step S523. Next, the activity unit 402 preferably generates an introduction request packet specifying the "friend" in the RAM 103 in step S524. Furthermore, the request transmitting unit 404 transmits the introduction request packet to the server device 261 through the wireless LAN interface 114 in step S525.

Thereafter, in response to the introduction request, the server device 261 preferably transmits an introduction-response packet. The wireless LAN interface 114 preferably receives the introduction-response packet in step S526.

In general, the response receiving unit 405 preferably stands by for several seconds or for several increments of ten seconds until the introduction-response packet is transmitted and received. During this period, an introduction-request packet transmitted from the "friend" terminal device 231 is preferably stored in the server device 261. Such a time margin may be general.

The address acquiring unit 406 preferably checks whether there is a MAC address stored in the external memory 112 categorized as a "friend" that matches any of the MAC addresses specified in the introduction-response packets, in step S527.

In the introduction request, it is possible to specify a "friend". In this case, the "friend" may be specified in the introduction response. When there is currently no friend, the introduction response may specify to that effect.

It is possible not to specify a "friend" in the introduction request. In this case, a MAC address of another terminal device 231 currently waiting for an introduction may be specified in the introduction request.

When there is no MAC address regarded as a "friend" in the MAC addresses specified in the introduction-response packets, the process preferably returns to step S525. The request transmitting unit 404 preferably transmits an introduction request packet again.

Note the activity unit 402 may notify the user that no "friend" can be found after the request transmitting unit 404 retries transmitting the packet plural times. The activity unit 402 may ask the user whether the request transmitting unit 404 should continue trying. When attempts to transmit an introduction request stop, the activity unit 402 may power off the information processing unit 101 or the process may return to the step S501.

In contrast, when the stored MAC address regarded as a "friend" is specified in the introduction-response packet (step S527; Yes), the address acquiring unit 406 preferably acquires the IP address and port number paired with the MAC address and specified in the introduction-response packet, in step S528.

As a result, the IP address and the port number acquired in the step S528 preferably identify the communication counterparties that have established a connection. Next, the activity unit 402 preferably progresses the process to the step S505 in order to communicate with the communication counterparty using the IP address and the port number and to advance the game.

When no connection in the infrastructure mode is established (step S522; No), the process preferably returns to the step S501.

Note that the activity unit 402 may terminate individual processes and ask the user whether to end the whole process or to retry the whole process right before individual processes are ended and the process returns to the step S501. In this case, in accordance with the result, the activity unit 402 may execute a process of, for example, turning off the information processing device 101.

Note that a MAC address may be categorized as a "friend" and stored in the external memory 112. In this case, the activity unit 402 may store such a MAC address in association with current date and hour acquired from the RTC 113.

In this case, if the following two conditions are satisfied in the step S527, the process may progress to the step S528.

(First Condition): a MAC address specified in the introduction-response packet is a MAC address categorized as a "friend" and stored in the external memory 112.

(Second Condition): The date and hour stored in the external memory 112 in association with the MAC address is the most recent date and hour.

When a certain period has elapsed from that date and hour, the process may return to the step S501.

The information processing device 101 is preferably structured as explained above. Accordingly, children playing the network game can play the game in the virtual world while they face each other in the real world.

Note that the activity unit 402 may organize the contents in the external memory 112. The activity unit 402 may organize the contents right after saving in step S510 or erasing in step S511. Moreover, organizing the contents may be performed right after the information processing device 101 is powered on and the terminal process begins (not shown in the figure). The MAC address of another terminal device 231 which is a communication counterparty is preferably stored in the external memory 112 and categorized as a "friend". The activity unit 402 may erase a corresponding MAC address when a certain period (e.g., one week, one month, one year) elapses after the last communication with another terminal device 231.

In particular, the activity unit 402 may decide to erase only a MAC address acquainted during the communication in ad-hoc mode. In the ad-hoc mode, the plurality of users gather at the same real location to play a network game or the like. Thereafter, the users will be unable to play the network game over the computer communication network after a predetermined time elapses.

Under such a circumstance, it is possible to prod the users of respective terminal devices 231 to directly gather and meet one another and to carry out a cooperative activity. As a result, it becomes possible to suppress any additional trouble among the users.

Figure 6:
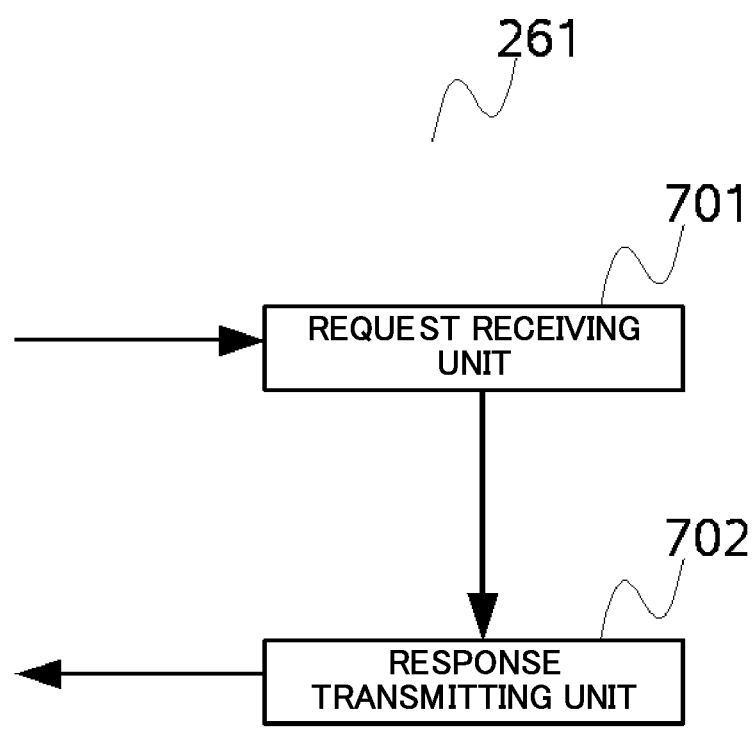
FIG. 6 is a block diagram showing an illustrative configuration of a server device according to the embodiment.

FIG. 6 is a block diagram showing a general preferred configuration of the server device 261 of the embodiment. An explanation will now be given with reference to this figure.

The server device 261 is preferably realized by running a server program in a computer for server purposes. The server device 261 preferably includes a request receiving unit 701 and a response transmitting unit 702.

The request receiving unit 701 preferably receives an introduction request transmitted from any one of the plurality of terminal devices 231.

Accordingly, the CPU 102, the RAM 103 which is preferably a temporal memory area, and a NIC preferably work together to function as the request receiving unit 701.

As explained above, in the introduction request, the unique identification information of the transmission-originator terminal device 231 and the unique identification information of the "friend" terminal device 231 of the transmission origina-tor are preferably specified. As the introduction request is received, the server device 261 preferably acquires the address of the transmission-originator terminal device 231 from the packet of the introduction request.

In contrast, the response transmitting unit 702 preferably transmits an introduction response specifying a pair of unique identification information of an introduced terminal device 231 and the address thereof to a transmission-originator terminal device 231 that has transmitted the introduction request. Note that this transmission is preferably carried out only when any two introduction requests among all received introduction requests satisfy a predetermined introduction condition.

Accordingly, the CPU 102, the RAM 103 which is preferably a temporal memory area, and the NIC preferably work together to function as the response transmitting unit 702.

The following are examples of introduction condition modes:

(1) A mode in which two introduction requests are selected at random from all introduction requests received within a recent certain period. In this mode, the server device 261 preferably does not check the introduction condition. In this case, distinguishing an "unknown third person" from a "friend" is preferably performed by the terminal device 231, which receives the introduction response. Accordingly, it is preferably not necessary for the terminal device 231 to specify the unique identification information of the "friend" terminal device 231 in the introduction request.

(2) A mode in which the server device 261 preferably performs introduction only when any two introduction requests received within a recent certain period satisfy the following two conditions.

(First Condition) Unique identification information specified in one introduction request matches the unique identification information of the terminal device 231, which has transmitted another introduction request.

(Second Condition) Unique identification information specified in another introduction request matches the unique identification information of the terminal device 231 which has transmitted the one introduction request.

In this case, the server device 261 preferably introduces the communication counterparty regarded as a "friend" to each terminal device 231.

Figure 7:
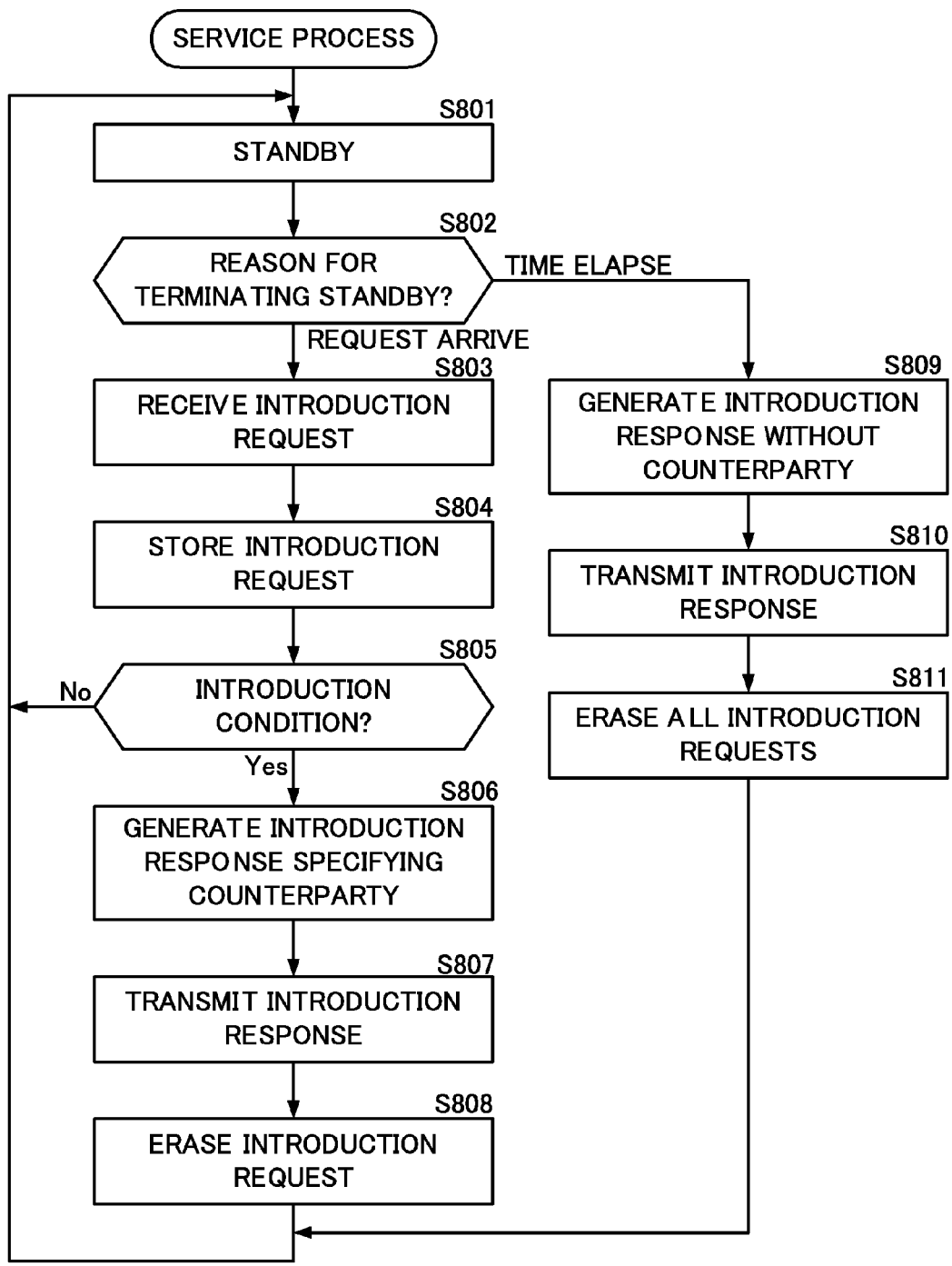
FIG. 7 is a flowchart showing a preferred series of steps for service process executed by an information processing device realizing the server device.

FIG. 7 is a flowchart showing a preferred flow of a control in a service process. The service process is executed by the information processing device 101 which preferably realizes the server device 261. An explanation will now be given with reference to this figure.

First, the service process is preferably started. The CPU 102 preferably stands by until any one of the following conditions is satisfied.

(First Condition) An introduction request arrives at the NIC.

(Second condition) A predetermined standby time elapses. The CPU 102 preferably checks the reason why the standby was terminated after standing by in step S802.

If standby was terminated because an introduction request arrived (first condition) (step S802; Request arrive), the CPU 102 preferably works together with the NIC, and receives the introduction request, in step S803. Then, the CPU 102 preferably temporarily stores the contents of the introduction request in the RAM 103 in association with a current time, in step S804.

When any one of the introduction requests temporarily stored in the RAM 103 satisfies the introduction condition (step S805; Yes), the CPU 102 preferably generates an introduction response corresponding to each introduction condition in the RAM 103, in step S806.

As explained above, this introduction response is preferably for introducing the terminal devices 231 to each other. In the introduction response, a pair of MAC addresses which are the unique identification information of the communication counterparty, and an IP address and a port number that are the communication identifiers of the communication counterparty are specified.

The CPU 102 preferably works together with the NIC, and preferably transmits the introduction response to each terminal device 231 that has transmitted the introduction request, in step S807. The CPU 102 preferably erases the introduction request from the RAM 103, in step S808, and the process preferably returns to step S801.

In contrast, if there is no introduction request satisfying the introduction condition (step S805; No), the process preferably returns to the step S801.

Meanwhile, when the standby is terminated as a predetermined standby time elapses (second condition) (step S802; Time elapsed), the CPU 102 preferably generates an introduction response specifying that "there is no presentable counterparty" corresponding to each introduction request temporarily stored in the RAM 103, in step S809. Next, the CPU 102 preferably works together with the NIC, and preferably transmits the introduction response to each terminal device 231 that has transmitted the introduction request, in step S810. Thereafter, the CPU 102 preferably erases the introduction request from the RAM 103, in step S811, and the process preferably returns to step S801.

In addition, the server device 261 may employ a mode like a lobby server in normal network games. In this case, the server device 261 may introduce the terminal device 231 satisfying the aforementioned introduction condition to each other.

As explained above, in a preferred embodiment, only "friends" can preferably play a game together through a communication in the infrastructure mode. Note that a friend means another player who has actually met the user with a communication in the ad-hoc mode. Therefore, it is possible to prevent the user from falling into trouble with an unknown third person.

The terminal device 231 may further specify the unique identification information of another terminal device 231 stored in the memory unit 403. The server device 261 may specify the unique identification information of another terminal device 231 and the address thereof in an introduction response. The unique identification information of another terminal device 231 contained in an introduction request to the server device 261 preferably matches the unique identification information specified in an introduction request transmitted from the terminal device 231.

In a preferred embodiment, the server device 261 preferably combines two introduction requests and preferably transmits an introduction response. However, the server device 261 may store each introduction request every time the server device 261 receives an introduction request. In this case, the server device 261 may specify all the unique identification information of introduction request transmission originators currently stored in an introduction response. Such a simple scheme can be adopted.

In this case, each terminal device 231 receiving the introduction request individually may determine whether to execute an online game. When executing the online game, the terminal devices 231 may notify the server device 261 to that effect.

In response to such a notification, the server device 261 may erase an introduction request that the transmission originator thereof is the terminal device 231, which has determined to establish a communication, among stored introduction requests.

An embodiment of the present application is appropriate for an operation in which players build intimacy through a lobby server or the like, while at the same time, a combination of users who can play an online game with each other are restricted.

As explained above, the present application discloses a terminal device, a communication system, a terminal method which can prevent a user from falling in trouble with an unknown third person when the user advances a cooperative activity like a network game through a computer communication network, and a computer-readable information memory medium storing a program which realizes those using a computer.

Having described and illustrated the principles of this application by reference to one embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A terminal device that communicates with a server device or a second terminal device, the terminal device comprising:
   a communication unit that attempts a connection in an ad-hoc mode or in an infrastructure mode with the second terminal device, and
   (a) identifies a communication counterparty between the terminal device and the second terminal device through unique identification information of the communication counterparty in the ad-hoc mode when the connection is established in the ad-hoc mode, and
   (b) identifies a communication counterparty between the terminal device and second terminal device through unique identification information of the communication counterparty and an address assigned to the communication counterparty in a computer communication network in the infrastructure mode when the connection is established in the infrastructure mode;
   an activity unit that exchanges activity information to and from the second terminal device that becomes available to advance a cooperative activity based on an instruction from a user when a connection is established in the ad-hoc mode or the infrastructure mode;
   a memory unit that stores the unique identification information of the second terminal device that advances the cooperative activity together with the terminal device when a connection in the ad-hoc mode with the second terminal device is established;
   a request transmitting unit that transmits an introduction request to the server device when a connection in the infrastructure mode is established with the second terminal device;
   a response receiving unit that receives an introduction response which is transmitted from the server device and specifies a pair of unique identification information of the second terminal device having transmitted an introduction request to the server device and an address of the second terminal device in the computer communication network; and an address acquiring unit that acquires an address included in a pair, having unique identification information of the second terminal device that matches unique identification information stored in the memory unit, among pairs specified in the introduction responses, and wherein the communication unit (c) enables a communication with the second terminal device based on the unique identification information of the second terminal device acquired at connection establishment, when a connection is established in the ad-hoc mode, and (d) enables a communication with the second terminal device based on the acquired address when a connection is established in the infrastructure mode, wherein the activity unit prevents communication in the infrastructure mode unless communication had previously been enabled in the ad-hoc mode.

2. The terminal device according to claim 1, wherein
unique identification information stored in the memory unit is further specified in the introduction request, and
the server device specifies a pair of unique identification information of a second terminal device, having unique identification information matching unique identification information specified in an introduction request transmitted from the terminal device, among other terminal devices each transmitted an introduction request to the server device, and an address of the second terminal device in the computer communication network in an introduction response.

3. The terminal device according to claim 1, wherein
unique identification information of the second terminal device among other terminal devices each having unique identification information stored in the memory unit is erased from the memory unit after a predetermined period elapses since the communication unit established a communication in the ad-hoc mode and became available for communication.

4. The terminal device according to claim 1, wherein
when a communication with the second terminal device through the communication unit is disabled, the activity unit saves a state of the cooperative activity in association with unique identification information of the second terminal device, and when a communication with the second terminal device is re-enabled, the activity unit restores the state of the cooperative activity saved in association with the unique identification information of the second terminal device which becomes available for communication, and continues the cooperative activity.

5. The terminal device according to claim 1, wherein
the unique identification information is a Media Access Control ("MAC") address and the address is an Internet Protocol ("IP") address and a port number, and the communication unit establishes a connection in the infrastructure mode as a temporal IP address is dynamically assigned thereto.

6. A communication system comprising a plurality of terminal devices according to claim 2, and a server device that communicates with the terminal devices, wherein
the server device comprises:
a request receiving unit which receives an introduction request transmitted from any of the plurality of terminal devices; and
a response transmitting unit, and wherein
when in any two introduction requests among all received introduction requests,
(p) unique identification information specified in one introduction request matches unique identification information of a second terminal device which has transmitted another introduction request, and
(q) unique identification information specified in another introduction request matches unique identification information of one of the plurality of terminal devices which has transmitted the one introduction request,
the response transmitting unit
(r) transmits an introduction response specifying a pair of unique identification information of the second terminal devices which has transmitted another introduction request and an address of a transmission originator of another introduction request to the one of the plurality of terminal devices, and
(s) transmits an introduction response specifying a pair of unique identification information of the one of the plurality of terminal devices which has transmitted the one introduction request and an address of a transmission originator of the one introduction request to the second terminal device.

7. A method for game communication and advancement executed by a terminal device comprising:
attempting a connection, via a communication unit, in an ad-hoc mode or in an infrastructure mode with a second terminal device;
(a) identifying a communication counterparty, via the communication unit, between the terminal device and the second terminal device through unique identification information of the communication counterparty in the ad-hoc mode, when the connection is established in the ad-hoc mode;
(b) identifying a communication counterparty, via the communication unit, between the terminal device and the second terminal device through unique identification information of the communication counterparty and an address assigned to the communication counterparty in a computer communication network in the infrastructure mode, when the connection is established in the infrastructure mode;
exchanging activity information to and from the second terminal device that becomes available to advance a cooperative activity based on an instruction from a user when the connection is established in the ad-hoc mode or the infrastructure mode;
storing in a memory unit the unique identification information of the second terminal device that advances the cooperative activity together with the terminal device when a connection in the ad-hoc mode with the second terminal device is established;
transmitting an introduction request, via a request transmitting unit, to the server device when a connection in the infrastructure mode is established with the second terminal device;
receiving an introduction response, via a response receiving unit, which is transmitted from the server device and specifies a pair of unique identification information of the second terminal device having transmitted an introduction request to the server device and an address of the second terminal device in the computer communication network;
acquiring an address, via an address acquiring unit, included in a pair, having unique identification information of the second terminal device that matches unique identification information stored in the memory unit among pairs specified in the introduction responses;
(c) enabling a communication with the second terminal device based on the unique identification information of the second terminal device acquired at connection establishment, when the connection is established in the ad-hoc mode; and (d) enabling a communication with the second terminal device based on the acquired address when the connection is established in the infrastructure mode, wherein the activity unit prevents communication in the infrastructure mode unless communication had previously been enabled in the ad-hoc mode.

8. A non-transitory computer-readable medium having a program embodied therein that allows a computer to function as a terminal device which communicates with a server device or a second terminal device, the program m further allowing the computer to function as:

a communication unit that attempts a connection in an ad-hoc mode or in an infrastructure mode with the second terminal device, and (a) identifies a communication counterparty between the terminal device and the second terminal device through unique identification information of the communication counterparty in the ad-hoc mode when the connection is established in the ad-hoc mode, and (b) identifies a communication counterparty between the terminal device and second terminal device through unique identification information of the communication counterparty and an address assigned to the communication counterparty in a computer communication network in the infrastructure mode when the connection is established in the infrastructure mode;

an activity unit that exchanges activity information to and from the second terminal device that becomes available to advance a cooperative activity based on an instruction from a user when a connection is established in the ad-hoc mode or the infrastructure mode;

a memory unit that stores the unique identification information of the second terminal device that advances the cooperative activity together with the terminal device when a connection in the ad-hoc mode with the second terminal device is established;

a request transmitting unit that transmits an introduction request to the server device when a connection in the infrastructure mode is established with the second terminal device;

a response receiving unit that receives an introduction response which is transmitted from the server device and specifies a pair of unique identification information of the second terminal device having transmitted an introduction request to the server device and an address of the second terminal device in the computer communication network; and an address acquiring unit that acquires an address included in a pair, having unique identification information of the second terminal device that matches unique identification information stored in the memory unit, among pairs specified in the introduction responses, and wherein the communication unit (c) enables a communication with the second terminal device based on the unique identification information of the second terminal device acquired at connection establishment, when a connection is established in the ad-hoc mode, and (d) enables a communication with the second terminal device based on the acquired address when a connection is established in the infrastructure mode, wherein the activity unit prevents communication in the infrastructure mode unless communication had previously been enabled in the first ad-hoc mode.

* * * * *

UNITED STATES PATENT AND TRADEMARK OFFICE
CERTIFICATE OF CORRECTION

| | |
|---|---|
| PATENT NO. | : 8,462,700 B2 |
| APPLICATION NO. | : 12/710507 |
| DATED | : June 11, 2013 |
| INVENTOR(S) | : Shoji Mori |

It is certified that error appears in the above-identified patent and that said Letters Patent is hereby corrected as shown below:

In the Claims

Column 23, line 13: Please delete the "m" between the words program and further.

Signed and Sealed this
Twentieth Day of August, 2013

Teresa Stanek Rea
*Acting Director of the United States Patent and Trademark Office*